US010786764B2

(12) United States Patent
MacDonald

(10) Patent No.: US 10,786,764 B2
(45) Date of Patent: Sep. 29, 2020

(54) WATER FILTRATION APPARATUS WITH TOP-LOADING FILTER CARTRIDGE HOUSING

(71) Applicant: FILTER GROUP INC., North York (CA)

(72) Inventor: Daniel Nicholas MacDonald, North York (CA)

(*) Notice: Subject to any disclaimer, the term of this patent is extended or adjusted under 35 U.S.C. 154(b) by 209 days.

(21) Appl. No.: 15/911,001

(22) Filed: Mar. 2, 2018

(65) Prior Publication Data

US 2019/0270038 A1 Sep. 5, 2019

(51) Int. Cl.
*B01D 29/15* (2006.01)
*B01D 39/16* (2006.01)
*B01D 27/08* (2006.01)
*C02F 1/28* (2006.01)
*C02F 1/00* (2006.01)
*B01D 36/00* (2006.01)
*B01D 35/30* (2006.01)
*B01D 15/00* (2006.01)
*C02F 101/12* (2006.01)

(Continued)

(52) U.S. Cl.
CPC ............ *B01D 29/15* (2013.01); *B01D 15/00* (2013.01); *B01D 27/08* (2013.01); *B01D 35/308* (2013.01); *B01D 36/001* (2013.01); *B01D 39/16* (2013.01); *C02F 1/003* (2013.01); *C02F 1/283* (2013.01); *B01D 2201/301* (2013.01); *B01D 2201/304* (2013.01); *B01D 2201/309* (2013.01); *B01D 2201/4092* (2013.01); *C02F 2101/12* (2013.01); *C02F 2101/20* (2013.01); *C02F 2101/322* (2013.01)

(58) Field of Classification Search
CPC ........ B01D 29/15; B01D 39/16; B01D 27/08; B01D 36/001; B01D 35/308; B01D 15/00; B01D 2201/301; B01D 2201/309; B01D 2201/304; B01D 2201/4092; C02F 1/283; C02F 1/003; C02F 2101/12; C02F 2101/20; C02F 2101/322; C02F 2201/006; C02F 2307/06
See application file for complete search history.

(56) References Cited

U.S. PATENT DOCUMENTS 3,883,428 A * 5/1975 Waring ................. B01D 15/00
210/94
5,264,119 A * 11/1993 Rollins ................. B01D 29/15
210/90

(Continued)

*Primary Examiner* — Liam Royce
(74) *Attorney, Agent, or Firm* — Bennett Jones LLP

(57) ABSTRACT

An apparatus for filtering water includes a tubular housing defining a housing interior for holding a filter cartridge that radially divides the housing interior into a feed zone and a filtrate zone. The housing interior extends vertically from a bottom end to an upper end defining an upper end opening that is sized to allow the filter cartridge to be inserted into and removed from the housing interior. A lid is removably attached in sealing relationship to the housing top end to prevent water flow out of the housing interior via the housing top end opening. A distributor, attached in sealing relationship to the housing bottom end, has an inflow passage for directing water flow into the feed zone of the housing interior, and an outflow passage for directing water flow out of the filtrate zone of the housing interior, and into a tank storing a granular filtration medium.

7 Claims, 9 Drawing Sheets

(51) Int. Cl.
    *C02F 101/20* (2006.01)
    *C02F 101/32* (2006.01)

(56) References Cited

U.S. PATENT DOCUMENTS

| | | | |
|---|---|---|---|
| 6,797,168 B1 * | 9/2004 | Knight | B01D 29/15 210/497.01 |
| 2016/0045844 A1 * | 2/2016 | Tyler | B01D 29/606 210/739 |

* cited by examiner

WATER FILTRATION APPARATUS WITH TOP-LOADING FILTER CARTRIDGE HOUSING

FIELD OF THE INVENTION

The present invention relates to water filtration systems installed at a point-of-use or a point-of-entry of plumbing networks in buildings, and more particularly to a top-loading filter cartridge housing for such systems.

BACKGROUND OF THE INVENTION

FIG. 1 shows a side view of a conventional water filtration system. The system may be installed as a point-of-use system beneath a sink to filter water for a single faucet, or as a larger point-of-entry or "whole home" system in a basement or a utility room to filter water for a plumbing network. In either case, the system may have one filter assembly, or, as shown in FIG. 1, multiple filter assemblies linked in series. Each filter assembly has a distributor that is connected to inflow and outflow lines, and a filter housing that holds a filter cartridge. The distributor directs unfiltered water from the inflow line to the filter housing where the filter cartridge traps contaminants, and directs filtered water from the filter housing to the outflow line. The filter housing has a canister form with an open top end and a closed bottom end. The bottom of the distributor and the top end of the filter housing have complementary threads so that the filter housing can be screwed onto the distributor, which acts as a cap for the open top end of the filter housing.

When the filter cartridge requires replacement, the lines connected to the distributor are isolated with valves, and the filter housing is unscrewed from the distributor. However, since the filter housing is a low point relative to the lines, the filter housing may be full of water that needs to be poured down a drain. The user must take care to avoid spilling the water when transferring the filter housing to the drain. In the case of larger filter housings, water in the filter housing may make the filter housing heavy and difficult to handle for some users. Moreover, upon unscrewing the filter housing, any water left in the lines between the isolation valves will flow out through the distributor. As such, the user must have buckets, mops or absorbent materials on hand to deal with the draining water.

Accordingly, there is a need in the art for a water filtration system that allows for cleaner and more convenient replacement of the filter cartridge than conventional systems.

SUMMARY OF THE INVENTION

In one aspect, the present invention comprises an apparatus for filtering water. The apparatus comprise a tubular housing, a lid, and a distributor. The tubular housing defines a housing interior for holding a tubular filter cartridge radially dividing the housing interior into a feed zone and a filtrate zone. The housing interior extends vertically from a housing bottom end to a housing top end defining a housing top end. The housing top end opening is sized to allow the filter cartridge to be inserted into and removed from the housing interior. The lid is removably attached in sealing relationship to the housing top end to prevent water flow out of the housing interior via the housing top end opening. The distributor is attached in sealing relationship to the housing bottom end. The distributor defines an inflow passage for directing water flow into the feed zone of the housing interior, and an outflow passage for directing water flow out of the filtrate zone of the housing interior.

In an embodiment of the apparatus, the lid is removably attached to the housing top end by a threaded connection.

In an embodiment of the apparatus, the lid comprises contours for removably attaching the lid to the filter cartridge, so that the lid retains the filter cartridge when the filter cartridge is disposed outside of the housing interior.

In an embodiment of the apparatus, the inflow passage is for directing water flow from a distributor inlet to the feed zone of the housing interior.

In an embodiment of the apparatus, the housing bottom end is removably attached to the distributor.

In an embodiment of the apparatus, the apparatus further comprises a tank defining a tank interior for holding a granular filtration medium, and a tank opening. The distributor is removably attached in sealing relationship to the tank to control water flow out of the tank via the tank opening. The tank may be removably attached to the distributor by a threaded connection. The outflow passage is for directing water flow from the filtrate zone of the housing interior to the tank interior. The outflow passage may comprises a stand pipe extending downwardly from the distributor into the tank interior. The distributor further defines a second outflow passage for directing water flow out of the tank interior. The second outflow passage may direct water flow from the tank interior to a distributor outlet. The apparatus may further comprise a filter for preventing the granular filtration material from being carried by the water into the second outflow passage. The housing, the distributor and the tank may be disposed in a vertically aligned relationship with the tank disposed beneath the distributor.

In another aspect, the present invention comprises a method for filtering water. The method comprises the steps of:
 (a) providing a tubular housing defining a housing interior holding a tubular filter cartridge radially dividing the housing interior into a feed zone and a filtrate zone, the housing extending vertically from a housing bottom end to a housing top end defining a housing top end opening;
 (b) providing a distributor attached in sealing relationship to the housing bottom end, wherein the distributor defines an inflow passage for directing water flow into the feed zone of the housing interior, and an outflow passage for directing water flow out of the filtrate zone of the housing interior;
 (c) removably attaching a lid in sealing relationship to the housing top end to prevent water flow out of the housing interior via the housing top end opening; and
 (d) flowing water into the feed zone of the housing interior via the inflow passage, through the filter cartridge into the filtrate zone of the housing interior, and out of the filtrate zone of the housing interior via the outflow passage.

In an embodiment of the method, the method further comprises the steps of:
 (a) detaching the lid from the housing top end to expose the housing top end opening;
 (b) removing the filter cartridge from the housing interior through the housing top end opening, while the housing bottom end is attached to the distributor;
 (c) inserting a replacement filter cartridge into the housing interior through the housing top end opening, while the housing bottom end is attached to the distributor; and (d) removably re-attaching the lid in sealing relationship to the housing top end to prevent water flow out of the housing interior via the housing top end opening.

In an embodiment of the method, the method further comprises the steps of:

(a) providing a tank defining a tank interior holding a granular filtration medium, and a tank opening, wherein the distributor is removably attached in sealing relationship to the tank to control water flow out of the tank via the tank opening, wherein the outflow passage is for directing water flow from the filtrate zone of the housing interior to the tank interior, and wherein the distributor further defines a second outflow passage for directing water flow out of the tank interior; and (b) flowing water out of the filtrate zone of the housing interior into the tank interior via the outflow passage, through the granular filtration medium, and out of the tank interior via the second outflow passage.

Embodiments of the apparatus of present invention may be advantageous over conventional water filtration systems in the following respects. First, embodiments of the apparatus may allow for cleaner and more convenient replacement of the filter cartridge. When replacing the filter cartridge, any water contained in the housing will tend to remain in the housing interior, and does not need to be poured into a drain. Second, embodiments of the apparatus may allow a single distributor to sequentially direct water flow through two filtration media—that is, through the filter cartridge contained in the housing interior, and the granular filtration medium stored in the tank interior. Third, embodiments of the apparatus may have a vertical arrangement of the housing and the tank, which may allow for a more compact horizontal footprint of the apparatus in comparison with conventional water filtration systems that link multiple filter assemblies in series, and horizontally adjacent to each other.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF PREFERRED EMBODIMENT

Definitions

Any term or expression not expressly defined herein shall have its commonly accepted definition understood by a person skilled in the art.

Overview.

Figure 1:
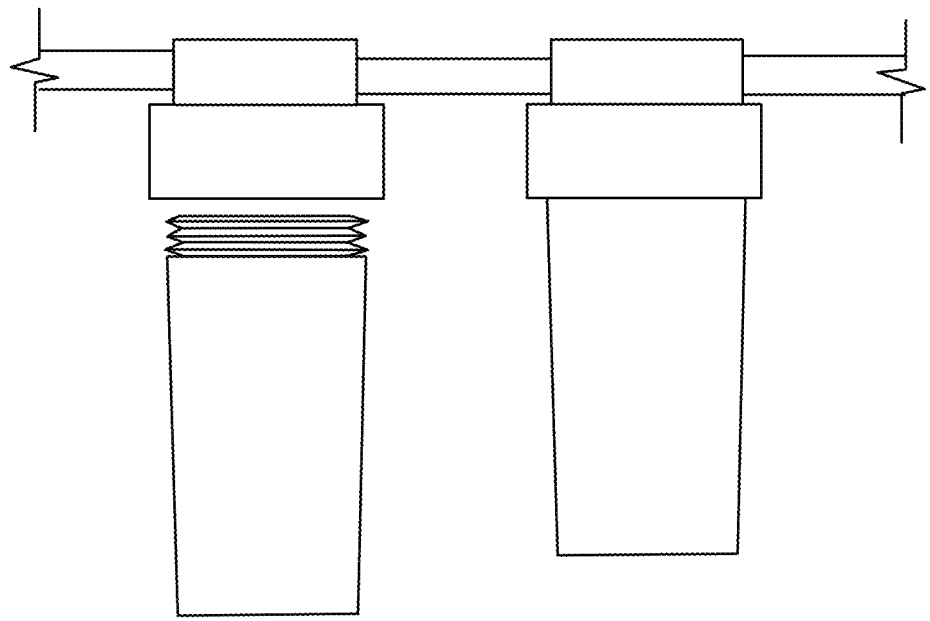
FIG. 1 shows a side view of a water filtration system in the prior art.
Figure 2:
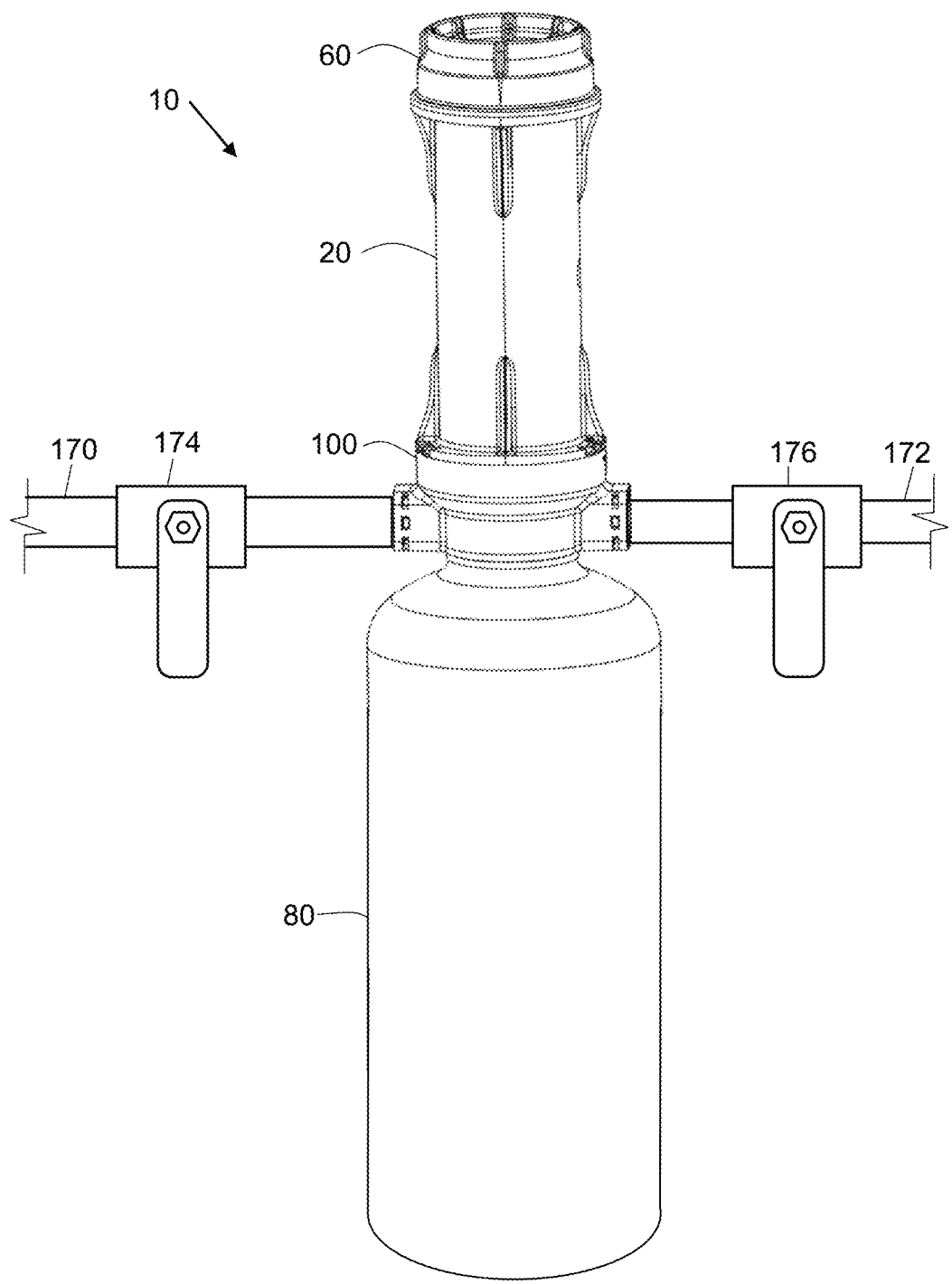
FIG. 2 shows a side perspective view of an embodiment of an apparatus of the present invention, when connected to inflow and outflow lines with isolation valves.
Figure 3:
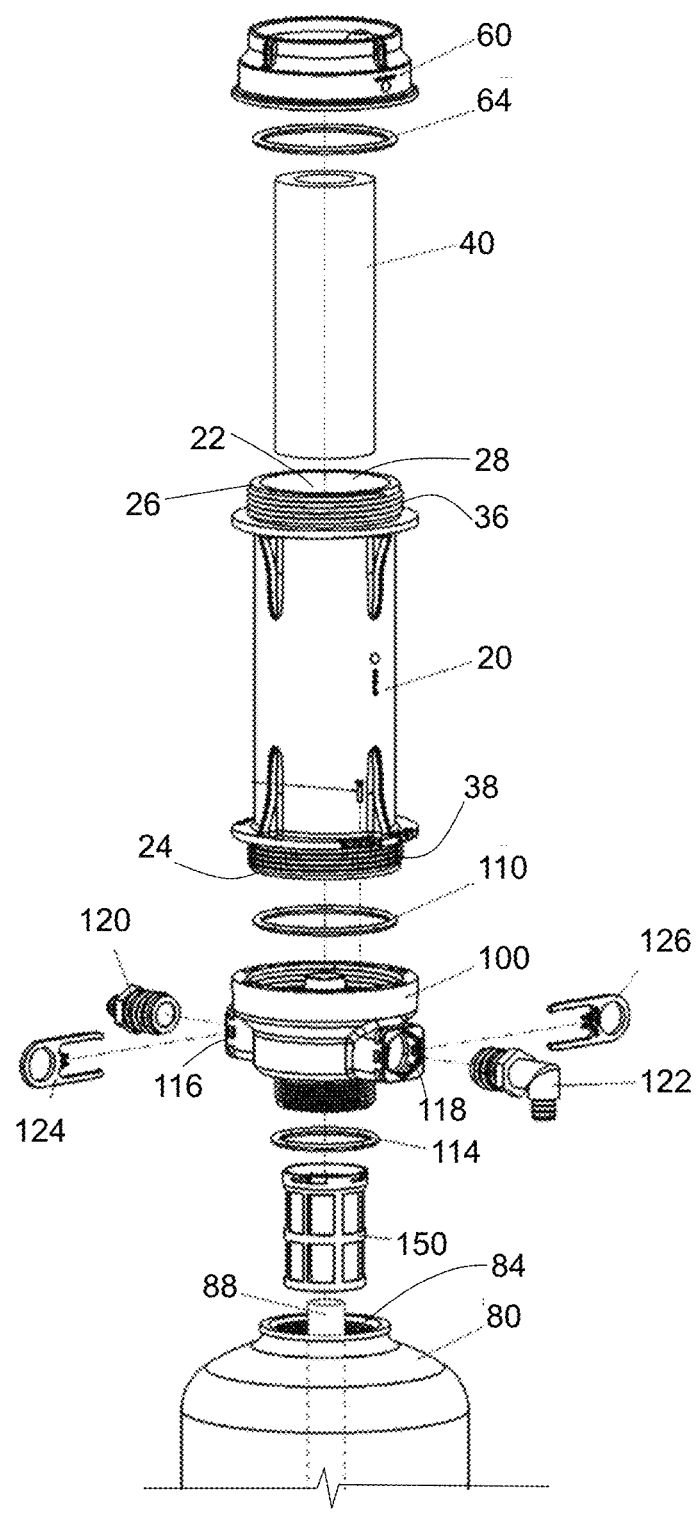
FIG. 3 shows an exploded side perspective view of the apparatus of FIG. 2.
Figure 4:
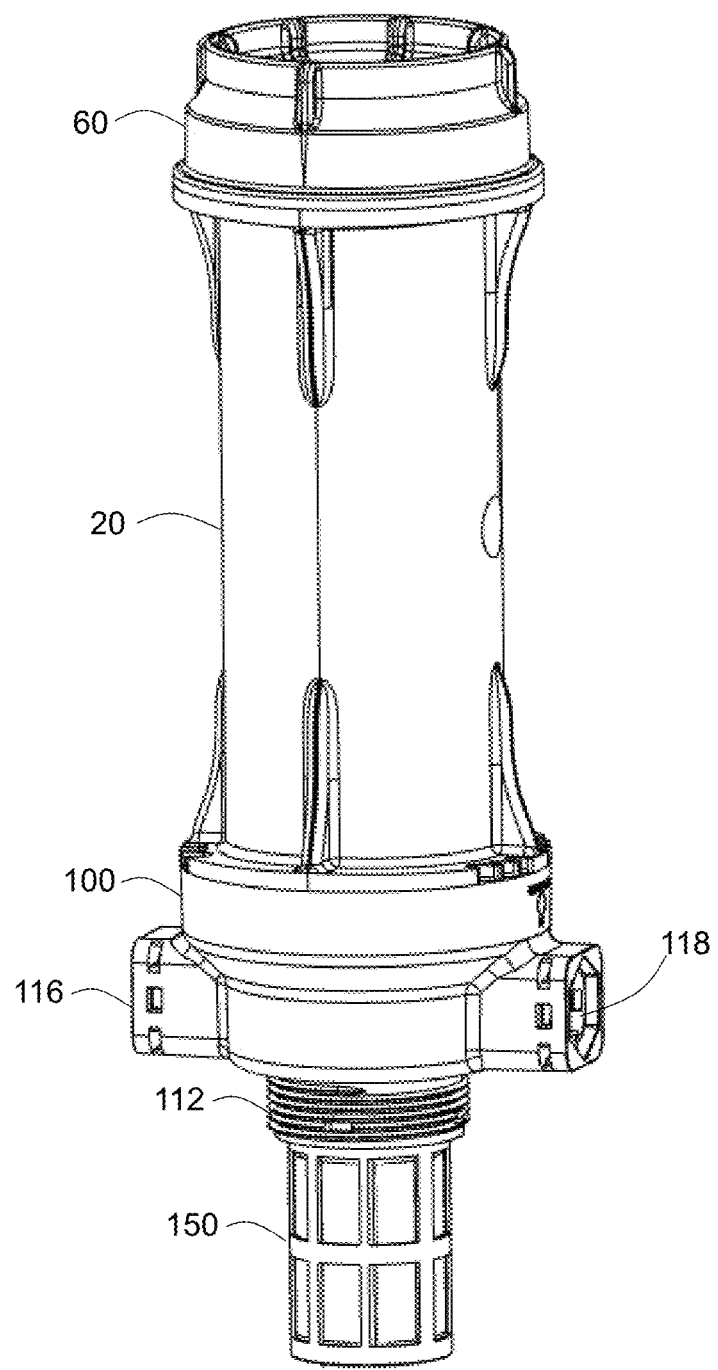
FIG. 4 shows a side perspective view of the assembled distributor, filter housing, and basket filter of the apparatus of FIG. 2.

FIG. 2 shows an embodiment of an apparatus (10) of the present invention for filtering water. Referring to FIGS. 2 and 3, the embodiment of the apparatus (10) includes a housing (20), a lid (60), a tank (80), a distributor (100), and a filter (150). These and other parts of the apparatus (10), and its use and operation are described in greater detail below.

Housing.

The housing (20) is tubular, and defines a housing interior (22) that extends vertically from a housing bottom end (24) to a housing top end (26). The housing top end (26) defines a housing top end opening (28) that is sized to allow a tubular filter cartridge (40) to be inserted into and removed from the housing interior (22).

Tubular filter cartridges (40) are known to persons of ordinary skill in the art of water filtration systems. The present invention is not limited by any particular type of filter cartridge (40). Filter cartridges (40) are available in a variety of sizes, and may contain a variety of different types of filtration media. As a non-limiting example, the filter cartridge (40) may be a "pre-filter" made of polypropylene, for removing particulate contaminants such as sediment and rust particles from water. As another non-limiting example, the filter cartridge (40) may contain granular activated carbon for removing chlorine, heavy metals, and volatile organic compounds from water.

Figure 8:
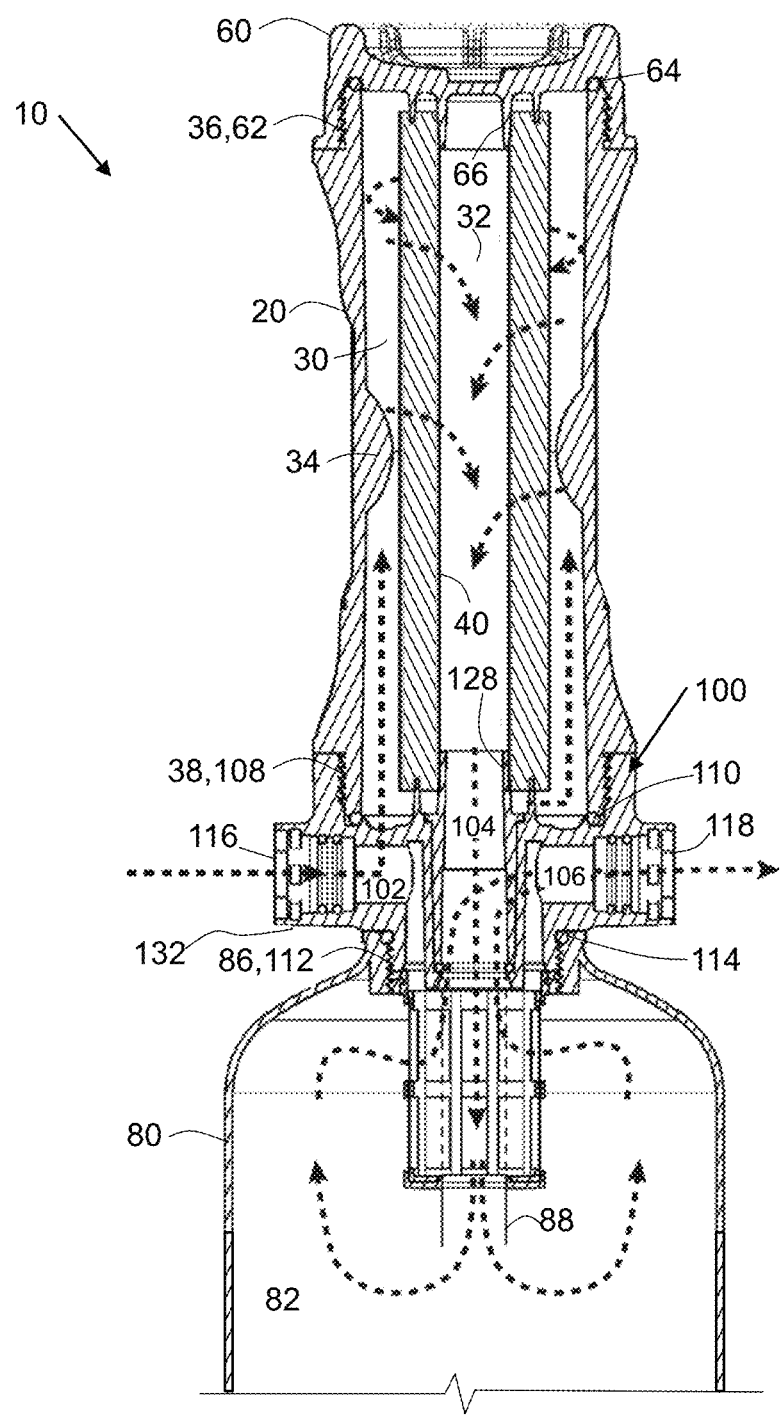
FIG. 8 shows a side cross-sectional view of the apparatus of FIG. 2, with dashed lines showing water flow through the apparatus.

As shown in FIG. 8, when the filter cartridge (40) is disposed in the housing interior (22), the filter cartridge (40) divides the housing interior (22) into a feed zone (30) and a filtrate zone (32). The feed zone (30) refers to that portion of the housing interior (22) through which water flows before passing through the filter cartridge (40). Conversely, the filtrate zone (32) refers to that portion of the housing interior (22) through which water flows after passing through the filter cartridge (40). In the embodiment shown in FIG. 8, the feed zone (30) and filtrate zone (32) are located on the radially outward and radially inward sides, respectively, of the filter cartridge (40), so that water flows radially inwards through the filter cartridge (40) towards the center of the filter housing. In other embodiments, the position of the feed zone (30) and filtrate zone (32) may be reversed so that water flows radially outwards through the filter cartridge (40) away from the center of the filter housing.

In the embodiments shown in the Figures, the housing (20) is molded from propylene copolymer or copolyester resin, and may be transparent so that the filter cartridge (40) is visible when inside the housing interior (22). In other embodiments, the housing (20) may be made of different materials.

In the embodiments shown in the Figures, the housing (20) has a circular horizontal cross-sectional shape so that the housing (20) as a whole has a substantially cylindrical shape. In other embodiments, the housing (20) may have different cross-sectional shapes, while retaining a tubular form.

In the embodiment shown in FIG. 8, the inner wall of the housing (20) defines protrusions (34) that extend radially inward to contact the outer surface of the filter cartridge (40). These protrusions (34) center the filter cartridge (40) within the housing interior (22) and separate the outer surface of the filter cartridge (40) from the inner wall of the housing (20), thus defining the feed zone (30) in between.

Lid.

The lid (60) is removably attached, in sealing relationship, to the housing top end (26) to prevent water flow out of the housing interior (22) via the housing top end opening (28).

In the embodiment shown in the Figures, the lid (60) is molded from propylene copolymer. In other embodiments, the lid (60) may be made of different materials.

In the embodiment shown in the Figures, the housing top end (26) and the bottom surface of the lid (60) and define complementary cylindrical threaded sections (36, 62) that allow the lid (60) to be screwed onto the housing top end (26). A top O-ring gasket (64) made of ethylene propylene diene monomer (EPDM) rubber is provided to better ensure a water-tight seal between the lid (60) and the housing top end (26). In other embodiments, the lid (60) may be removably attached in sealing relationship to the housing top end (26) using other types of connections and sealing elements as necessary.

In the embodiment shown in FIG. 8, the bottom surface of the lid (60) is contoured to define prongs (66) that engage the top end of the filter cartridge (40). These prongs (66) may be used to removably attach the filter cartridge (40) to the lid (60) before the lid (60) is attached to the housing top end (26). That is, the lid (60) can be used to hold the filter cartridge (40) as it is being inserted through the housing top end opening (28) into the housing interior (22). Once the filter cartridge (40) has been inserted into the housing interior (22), these prongs (66) help to retain the filter cartridge (40) in place within the housing interior (22). Further, these prongs (66) may removably attach the lid (60) to the filter housing (40) when it is being removed from the housing interior (22), although it will be appreciated that in order to do so the prongs (66) may have to be configured to sufficiently grip the filter cartridge (40) when wet and weighted with water. Accordingly, when the lid (60) is detached from the housing, the lid (60) retains the filter cartridge (40), and facilitates removal of the filter cartridge (40) from the housing interior (22).

Figure 5:
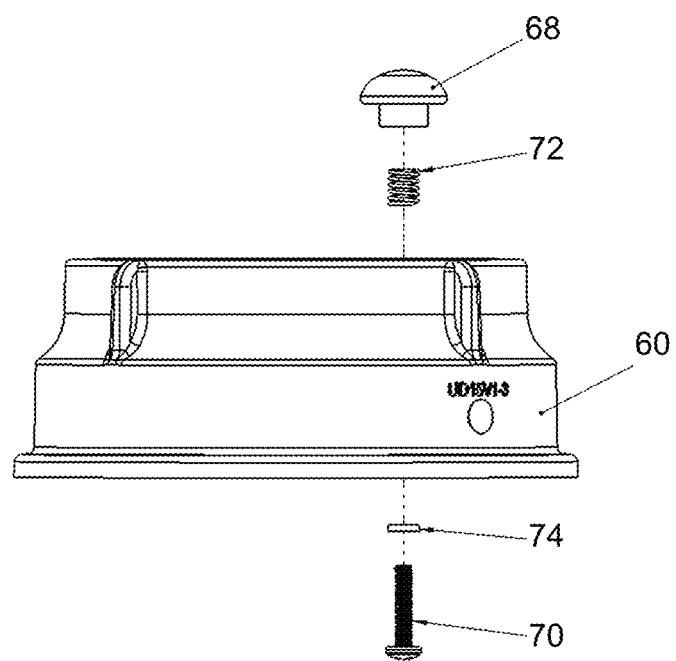
FIG. 5 shows an exploded side view of a lid assembly of the apparatus of FIG. 2.

In the embodiment shown in FIG. 5, the lid (60) comprises a valve for relieving gas pressure from the housing interior (22) when the lid (60) is attached to the housing. On account of the sealing relationship between the lid (60) and the housing (20), air entrained in water flowing through the housing interior (22) may become trapped within the upper end of the housing interior (22). The trapped air may result in excessive backpressure that impedes water flow through the housing interior (22). The valve may be opened to allow the trapped air to escape from the housing interior (22). In the embodiment shown in FIG. 5, the valve includes a button (68) on the upper surface of the lid (60), a screw (70) passing through a washer (74) and an opening formed in the lid (60) and attached to the bottom end of the button (68), and a spring (72) disposed between the upper surface of the lid (60) and the bottom surface of the button (68) to bias the button (68) to a position that occludes the opening in the lid (60). When the user pushes the button (68) downwards against the biasing force of the spring (72), the button (68) exposes the opening in the lid (60) to allow air to escape from the housing interior (22). In other embodiments, the valve may be formed from a different arrangement of parts.

Tank.

In embodiments where the tank (80) is provided, the tank (80) defines a tank interior (82) that holds a granular filtration medium for secondary filtering of the water after flowing through the filter cartridge (40) in the housing. The tank (80) also defines a tank opening (84) for loading the granular filtration medium into the tank interior (82). It will be understood that the tank (80) is optional, and as such, embodiments of the apparatus (10) may not include the tank (80).

Granular filtration media are known to persons of ordinary skill in the art of water filtration systems. The present invention is not limited by any particular type of granular filtration medium. As non-limiting example, the granular filtration medium may comprise granular activated carbon for removing chlorine, heavy metals, and volatile organic compounds from water. Such granular filtration media may be used in conjunction with a "pre-filter" filter cartridge (40) in the housing (20) that removes particulate contaminants such as sediment and rust particles from water. As another non-limiting example, the granular filtration material may be sand.

In the embodiment shown in the Figures, the tank (80) is made from fiberglass. The tank (80) is used in a "whole home" water filtration system, and has substantially cylindrical shape with a diameter of about 8 inches, and a height of about 44 inches for a total volume of about 2200 cubic inches. In other embodiments, the tank (80) may be made of different materials, and have different dimensions.

Distributor.

The distributor (100) is attached in sealing relationship to the housing bottom end (24). The distributor (100) defines an inflow passage (102) for directing water flow into the feed zone (30) of the housing interior (22), and a first outflow passage (104) for directing water flow out of the filtrate zone (32) of the housing interior (22). In embodiments of the apparatus (10) that includes a tank (80), the distributor (100) is also removably attached in sealing relationship to the tank (80). In such embodiments, the outflow passage permits water flow into the tank interior (82), and the distributor (100) further defines a second outflow passage (106) for directing water flow out of the tank interior (82).

In the embodiments shown in the Figures, the distributor (100) is molded from propylene copolymer. In other embodiments, the distributor (100) may be made of different materials.

In the embodiments shown in FIG. 5, the housing bottom end (24) and the top surface of the distributor (100) define complementary cylindrical threaded sections (38, 108) that allow the housing bottom end (24) to be screwed onto the distributor (100). A middle O-ring gasket (110) made of EPDM rubber fits is provided to better ensure a water-tight seal between the distributor (100) and the housing bottom end (24). In other embodiments, the distributor (100) may be attached in sealing relationship to the housing bottom end (24) using other types of connections and sealing elements as necessary. In other embodiments, the attachment of the distributor (100) in sealing relationship to the housing bottom end (24) may be achieved by the distributor (100) and the housing (20) being integrally constructed as a single part rather than as two separable parts.

In the embodiments shown in the Figures, the tank (80) and the bottom surface of the distributor (100) define complementary cylindrical threaded sections (86, 112) that allow the tank (80) to be screwed onto the distributor (100), with the bottom end of the distributor (100) received within the tank opening (84). A bottom O-ring gasket (114) made of EPDM rubber is provided to better ensure a water-tight seal between the distributor (100) and the tank (80). In other embodiments, the distributor (100) may be removably attached in sealing relationship to the tank (80) using other types of connections and sealing elements as necessary.

In the embodiments shown in FIG. 3, the distributor (100) defines an inlet (116), and an outlet (118) for connection to an inflow line (170) and an outflow line (172), respectively. In this embodiment, the inlet (116) and the outlet (118) are each provided with an adaptor fitting (120, 122) having cylindrical threaded connections that screw into the distributor (100), and a locking clip (124, 126) for securing an inflow line (170) and an outflow line (172), respectively, made of cross-linked polyethylene (PEX).

In the embodiment of the distributor (100) shown in the FIG. 8, the inflow passage (102) is defined by an outer annular-shaped opening in the distributor body (132), which opening surrounds the first outflow passage (104) and the second outflow passage (106). In this embodiment, when the distributor (100) is attached to the tank (80), the inflow passage (102) body allows water flow from the distributor inlet (116) to the feed zone (30) of the housing interior (22).

Figure 6:
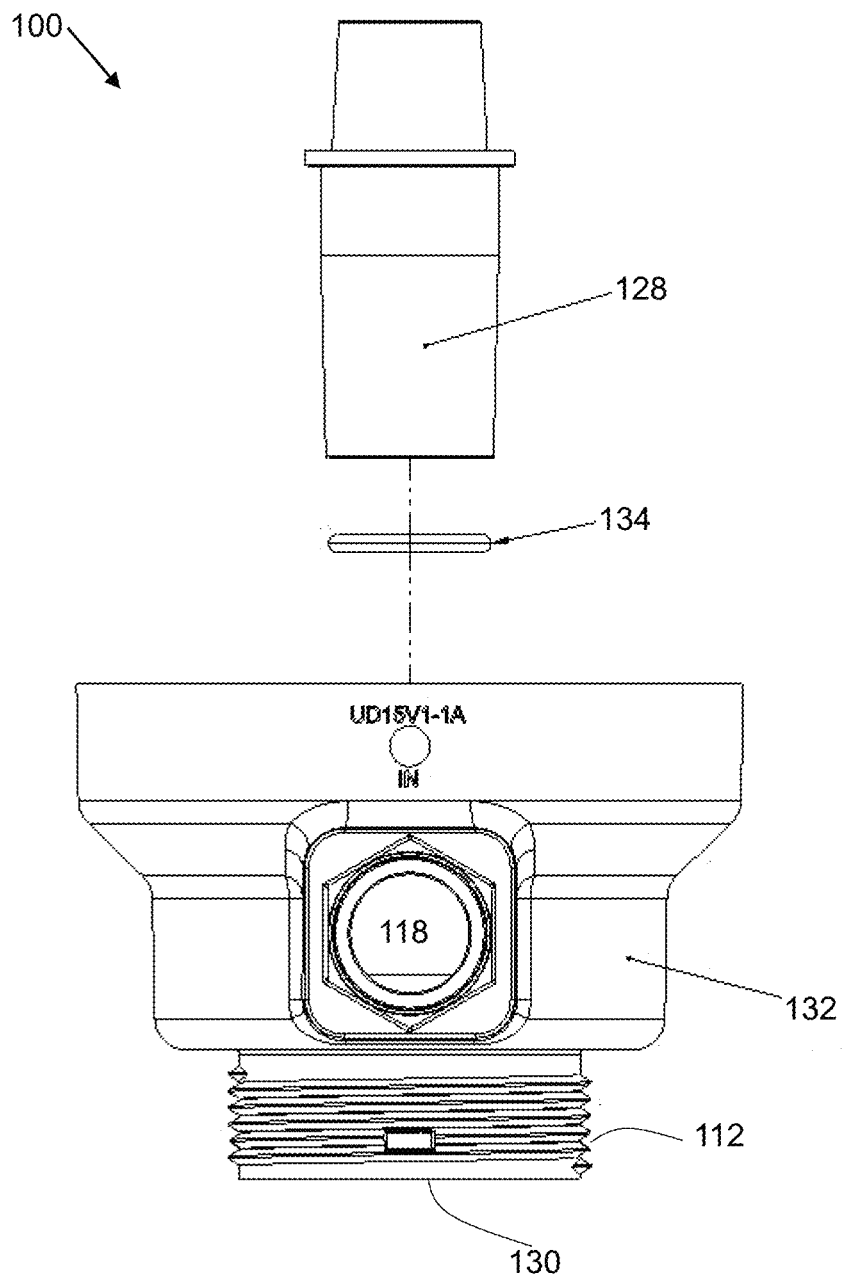
FIG. 6 shows an exploded side view of a distributor assembly of the apparatus of FIG. 2.

In the embodiment of the distributor (100) shown in FIGS. 6 and 8, the first outflow passage (104) is defined by a distributor tube (128) and a central opening (130) defined by the distributor body (132). The distributor tube (128) has a lower end that inserts into the central opening (130) until a stop formed on the tube engages a shoulder on the upper surface of the distributor body (132). An O-ring gasket (134) made of EPDM is provided to better ensure a water-tight seal between the distributor tube (128) and the distributor body (132). The upper end of the distributor tube (128) serves as a spindle that fits within the lower end of the tubular filter cartridge (40) when inserted in the housing interior (22). A stand pipe (88) engages the bottom surface of the distributor body (132) such that the distributor tube (128), and the stand pipe (88) form a continuous water flow path, extending into the tank interior (82) below the level of the granular filtration medium. In this embodiment, when the distributor (100) is attached to the tank (80), the first outflow passage (104) permits water flow from the filtrate zone (32) of the housing interior (22) to the tank interior (82) below the upper surface of the granular filtration medium.

In the embodiment of the distributor (100) shown in FIG. 8, the second outflow passage (106) is defined by an inner annular-shaped opening in the distributor body (132), which opening surrounds the distributor tube (128) and the central opening (130) defined by the distributor body (132). In this embodiment, when the distributor (100) is attached to the tank (80), the second outflow passage (106) permits water flow from the tank interior (82) to the distributor outlet (118).

Figure 9A:
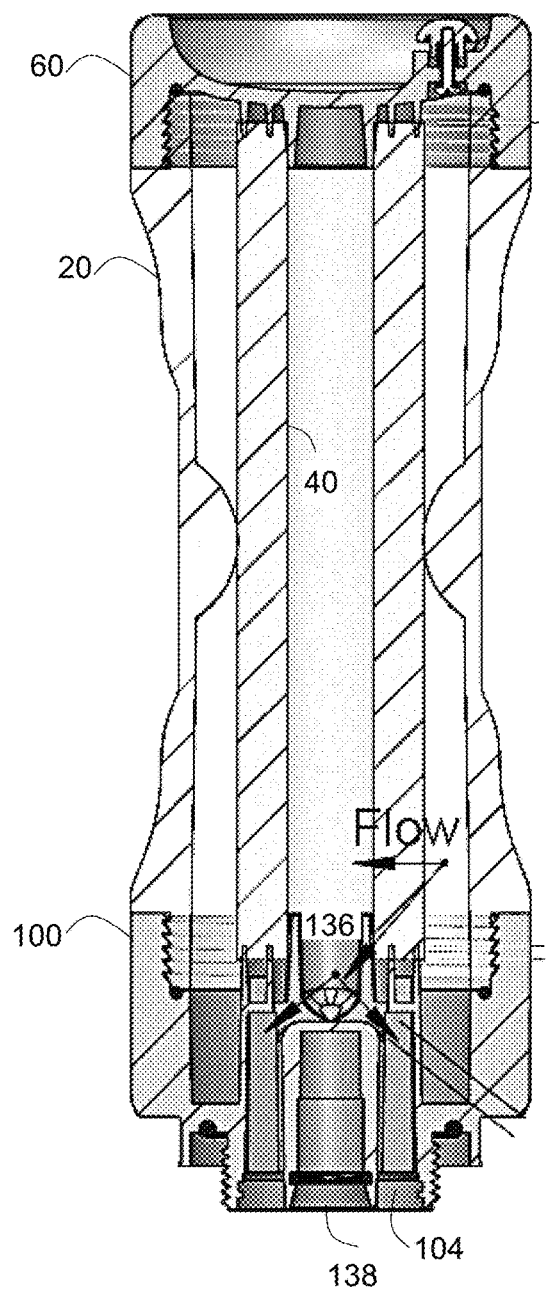
FIGS. 9A and 9B show a first and second side cross-sectional views through mutually perpendicular mid-section planes of an alternative embodiment of a lid, housing, filter cartridge and distributor assembly of the present invention.
Figure 9B:
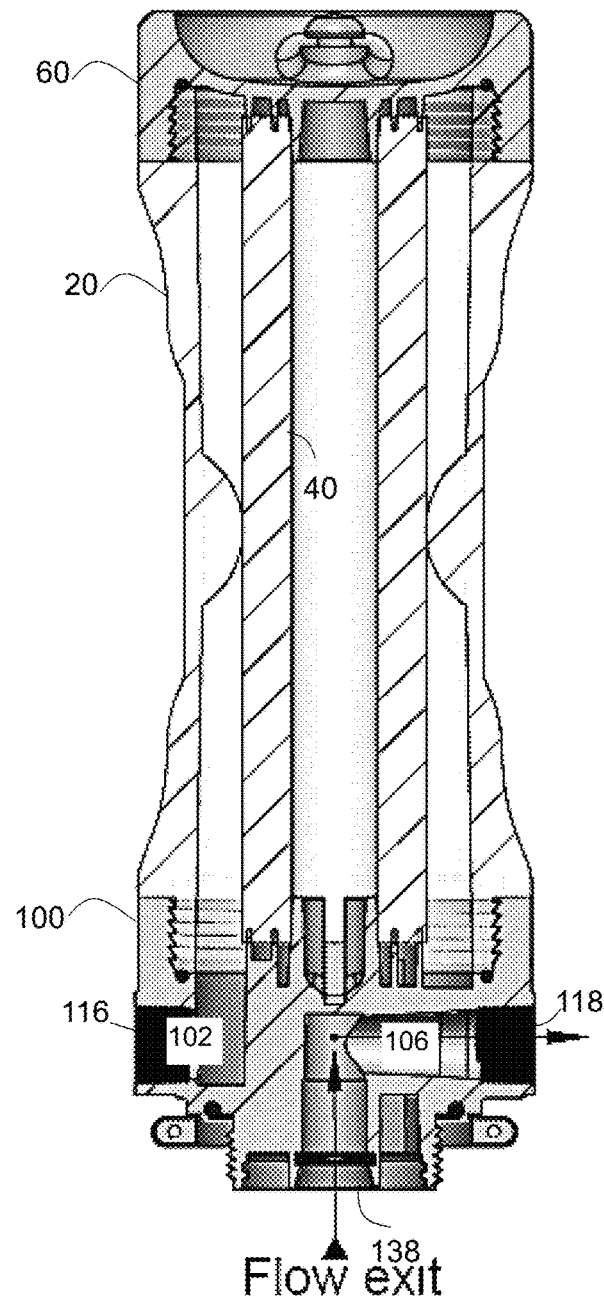

In other embodiments, the distributor (100) may define the inflow passage (102), the first outflow passage (104), and (if present), the second outflow passage (106) in a different manner. For example, FIGS. 9A and 9B show an alternative embodiment of the distributor (100) that differs from that shown in FIG. 8 in that the distributor (100) defines an upper central opening (136) and a lower central opening (138). The first outflow passage (104) is defined by the upper central opening (136), which has a lower end that surrounds the lower central opening (130). As seen in the cross-sectional view of FIG. 9A, the lower end of the upper central opening (136) bifurcates around the lower central opening (138). The second outflow passage (106) is defined by the lower central opening (138), which permits water flow from the tank interior (82) to the distributor outlet (118).

In another alternative embodiment (not shown), the distributor (100) may be used in conjunction with an apparatus (10) that does not include the tank (80). Accordingly, the distributor (100) may define the first outflow passage (104) such that it permits water flow directly from the filtrate zone (32) of the housing interior (22) to the distributor outlet (118). In such an embodiment, the second outflow passage (106) is not necessary.

Filter.

In embodiments where the filter (150) is provided, the filter (150) prevents the granular filtration medium in the tank interior (82) from being carried by the water flow into the second outflow passage (106). It will be understood that the filter (150) is optional, and as such, embodiments of the apparatus (10) may not include the filter (150).

Figure 7:
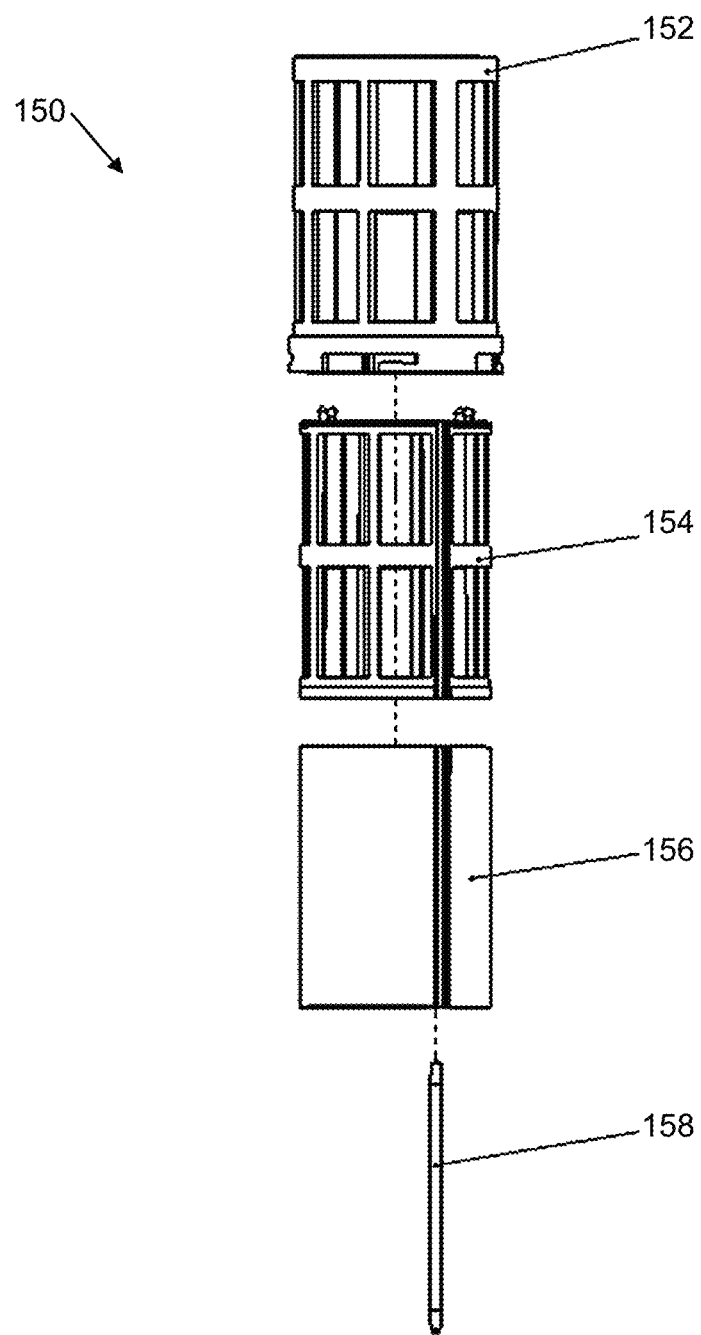
FIG. 7 shows an exploded side view of a basket filter assembly of the apparatus of FIG. 2.

In the embodiment shown in FIG. 7, the filter (150) is in the form of a basket filter that includes an outer filter cage (152), an inner filter cage (154), a mesh (156), and a mesh lock (158). The upper end of the basket filter (150) removably attaches to the bottom surface of the distributor (100). The basket filter (150) has a tubular form allowing the upper end of the stand pipe (88) to pass through the basket filter (150) and attach to the distributor (100). The outer filter cage (152) and the inner filter cage (154) retain the mesh (156) between them. The mesh lock (158) secures the circumferential ends of the mesh (156) together. The mesh (156) is made of 316 grade stainless steel (Society of Automotive Engineers (SAE) standard), and has opening sizes of about 0.180 millimeters or 0.0070 inches (U.S. standard mesh size number 80). In other embodiments, filters having different configurations may be used to prevent flow of granular filtration material from the tank interior (82) into the second outflow passage (106). In other embodiments, the circumferential ends of the mesh may be secured together by different means. For example, the outer filter cage (152) and the inner filter cage (154) may crimp the mesh (156) in place. In embodiments, the mesh lock (158) is not necessary if the circumferential ends of the mesh (156) do not need to be secured together.

Use and Operation.

In an exemplary use of the embodiment of the apparatus (10) shown in the Figures, the apparatus (10) may be installed as shown in FIG. 2, as a point-of-use system beneath a sink to filter water for a single faucet, or as a larger point-of-entry or "whole home" system in a basement or a utility room to filter water for a plumbing network. The distributor inlet (116) and the distributor outlet (118) are connected to the inflow line (170) and an outflow line (172), respectively, between valves (174, 176) (e.g., hand-operated ball valves) so that the apparatus (10) can be selectively isolated from water flow in the inflow line (170) and the outflow line (172). Once the distributor (100) has been so installed, the tank (80) containing the granular filtration medium is screwed onto the bottom side of the distributor (100). The housing containing the filter cartridge (40) is screwed on the top side of the distributor (100). The lid (60) is screwed onto the top end of the filter housing.

When the valves (174, 176) are opened, a positive differential in water pressure from the distributor inlet (116) to the distributor outlet (118) drives water flow through the apparatus (10). In this embodiment, as shown by the dashed lines in FIG. 8, water flows through the inflow passage (102) of the distributor (100) from the distributor inlet (116) to the feed zone (30) of the interior housing. The water then flows radially inwards through the filter cartridge (40) into the filtrate zone (32) of the housing interior (22). Subsequently, the water flows downwardly through the first outflow passage (104), which in this case is through the distributor tube (128) and central opening (130) of the distributor body (132) into the stand pipe (88) where it exits into the granular filtration medium stored in the tank interior (82). The water in the tank interior (82) flows in a generally upward direction through the granular filtration medium, then through the basket filter (150), and ultimately through the second outflow passage (106), the distributor outlet (118) and into the outflow line (172).

When the filter cartridge (40) requires replacement, the valves (174, 176) are closed to isolate the apparatus (10) from water flow in the inflow line (170) and the outflow line (172). While the housing (20) remains attached to the distributor (100), the user unscrews the lid (60) from the housing (20) to expose the housing top end opening (28). As the lid (60) is lifted away from the housing (20), the lid (60) may retain the removably attached filter cartridge (40) and remove it through the housing top end opening (28). Alternatively, if the lid (60) does not retain the filter cartridge (40), the user can lift the filter cartridge (40) through the housing top end opening (28). The user inserts a replacement filter cartridge (40) through the housing top end opening (28), and removably reattaches the lid (60) in sealing relationship to the housing top end (26). The user re-opens the valves (174, 176) to continue filtration of water.

Interpretation.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. An apparatus for filtering water, the apparatus comprising a distributor, an upper filter housing, and a lower filter tank, wherein:
   (a) the distributor is disposed between and releasably attached to the upper filter housing and the lower tank, wherein the distributor defines a first inflow passage for receiving water from an inlet and directing water upwards into a feed zone within the upper filter housing, a first outflow passage for receiving water from a filtrate zone within the upper filter housing and directing water into the lower tank disposed below the distributor, and a second outflow passage for receiving water from the lower tank and directing the water out a distributor outlet;
   (b) the upper filter housing is configured to receive a filter element which divides the upper filter housing interior volume into the feed zone and the filtrate zone; and
   (c) the tank defining an intake to receive water from the upper filter housing through the distributor first outflow passage, and an outlet for directing the water into the distributor second outflow passage.

2. The apparatus of claim 1, wherein the upper filter housing comprises a lid, opposite the distributor, which is removably attached to a housing top end.

3. The apparatus of claim 2, wherein the lid comprises contours for removably attaching the lid to a filter cartridge, so that the lid retains the filter cartridge when the filter cartridge is removed from the upper filter housing.

4. The apparatus of claim 1, wherein the tank is removably attached to the distributor by a threaded connection.

5. The apparatus of claim 1, wherein the first outflow passage comprises a stand pipe extending downwardly from the distributor into the tank interior.

6. The apparatus of claim 1, wherein the apparatus tank further comprises a filter screen for preventing granular filtration material from being carried by into the second outflow passage.

7. The apparatus of claim 2, wherein the housing, the distributor and the tank are disposed in a vertically aligned relationship.

* * * * *